United States Patent
Brandt et al.

(10) Patent No.: US 11,807,714 B2
(45) Date of Patent: Nov. 7, 2023

(54) SEMI-CRYSTALLINE MIXTURE OF POLYESTER POLYOLS, AND THE USE THEREOF

(71) Applicant: Henkel AG & Co. KGaA, Duesseldorf (DE)

(72) Inventors: Adrian Brandt, Essen (DE); Horst Beck, Neuss (DE); Alexander Kux, Monheim (DE); Kerstin Schroeder, Grevenbroich/Wevelinghoven (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 649 days.

(21) Appl. No.: 16/739,324

(22) Filed: Jan. 10, 2020

(65) Prior Publication Data

US 2020/0148814 A1    May 14, 2020

Related U.S. Application Data

(63) Continuation of application No. PCT/EP2018/064662, filed on Jun. 4, 2018.

(30) Foreign Application Priority Data

Jul. 13, 2017 (EP) .................................... 17181193

(51) Int. Cl.

| C08G 63/183 | (2006.01) |
|---|---|
| C08G 63/199 | (2006.01) |
| C08L 67/02 | (2006.01) |
| C09J 167/02 | (2006.01) |
| C08G 18/42 | (2006.01) |
| C08G 59/62 | (2006.01) |
| C08G 63/672 | (2006.01) |
| C09J 175/06 | (2006.01) |

(52) U.S. Cl.
CPC ......... *C08G 63/183* (2013.01); *C08G 18/425* (2013.01); *C08G 18/4247* (2013.01); *C08G 18/4252* (2013.01); *C08G 18/4255* (2013.01); *C08G 59/62* (2013.01); *C08G 63/199* (2013.01); *C08G 63/672* (2013.01); *C08L 67/02* (2013.01); *C09J 167/02* (2013.01); *C09J 175/06* (2013.01); *C08G 2170/20* (2013.01)

(58) Field of Classification Search
CPC .............. C08G 63/183; C08G 63/199; C08G 2170/20; C08G 18/4255; C08G 18/4252; C08G 63/672; C08G 59/62; C08G 18/4247; C08G 18/425; C08L 67/02; C09J 167/02; C09J 175/06
See application file for complete search history.

(56) References Cited

U.S. PATENT DOCUMENTS

| 3,699,187 | A | 10/1972 | Gardziella |
|---|---|---|---|
| 5,434,237 | A | 7/1995 | Weinelt et al. |
| 6,562,899 | B2 | 5/2003 | Buter et al. |
| 8,063,170 | B2 | 11/2011 | Fallais et al. |
| 8,334,035 | B2 | 12/2012 | Nefzger et al. |
| 8,383,728 | B2 | 2/2013 | Brenner et al. |
| 8,481,606 | B2 | 7/2013 | Nefzger et al. |
| 8,912,245 | B2 | 12/2014 | Lista |
| 9,785,074 | B2 | 10/2017 | Nagata et al. |
| 10,301,516 | B2 | 5/2019 | Li et al. |
| 2010/0249291 | A1 | 9/2010 | Ichihashi et al. |
| 2011/0166316 | A1 | 7/2011 | Duwenhorst et al. |

(Continued)

FOREIGN PATENT DOCUMENTS

| CH | 711540 B1 | 6/2017 |
|---|---|---|
| CN | 1487001 A | 4/2004 |
| CN | 1683425 A | 10/2005 |

(Continued)

OTHER PUBLICATIONS

International Search Report for International PCT Patent Application No. PCT/EP2018/064662 dated Sep. 28, 2018.
DIN EN 1238:2011.

*Primary Examiner* — Rabon A Sergent
(74) *Attorney, Agent, or Firm* — James E. Piotrowski (57) ABSTRACT

The present invention relates to a semi-crystalline mixture of polyester polyols which recrystallises upon melting and which can be obtained by polycondensing a reaction mixture comprising one or more dicarboxylic acids selected from saturated aliphatic dicarboxylic acids having an even number of at least 8 methylene groups, and one or more diols selected from aliphatic diols which have at least one ether function. The invention also relates to a polymeric material which is obtained from the chemical modification of the mixture of polyester polyols with organic compounds which contain at least one isocyonate group and/or epoxide group. The mixtures and materials according to the invention are characterised by relatively low melting enthalpies, while the melting temperature can be set in a range of −30 to 60° C., meaning that it is possible to obtain easily fusible formulations containing the mixtures and materials according to the invention. The mixtures and materials according to the invention also provide such formulations with a high elasticity and breaking resistance. The present invention therefore includes the use of the polyester polyols and polymeric materials according to the invention as deforming, fusing, and extrusion means in thermoplastic materials, and the use thereof for producing adhesives and sealants, in particular hot-melt adhesives and reactive adhesives.

20 Claims, 4 Drawing Sheets

(56) References Cited

U.S. PATENT DOCUMENTS

2011/0201716 A1    8/2011   Gehinger et al.
2017/0066950 A1*   3/2017   Bae ........................ C08G 63/64

FOREIGN PATENT DOCUMENTS

| | | |
|---|---|---|
| CN | 101469259 A | 7/2009 |
| CN | 101501096 A | 8/2009 |
| CN | 101974147 A | 2/2011 |
| CN | 102115528 A | 7/2011 |
| CN | 102159612 A | 8/2011 |
| CN | 102159613 A | 8/2011 |
| CN | 102245668 A | 11/2011 |
| CN | 102388081 A | 3/2012 |
| CN | 103044665 A | 4/2013 |
| CN | 105399937 A | 3/2016 |
| CN | 106397755 A | 2/2017 |
| EP | 1149850 A1 | 10/2001 |
| JP | H0543516 A | 2/1993 |
| JP | H08295727 A | 11/1996 |
| JP | 2006078982 A | 3/2006 |
| JP | 2013080112 A | 5/2013 |
| RU | 2123997 C1 | 12/1998 |
| RU | 2265620 C2 | 12/2005 |
| RU | 2008138544 A | 4/2010 |
| RU | 2011122528 A | 12/2012 |
| RU | 2479613 C2 | 4/2013 |
| SU | 474996 A3 | 6/1975 |
| WO | 2015118893 A1 | 8/2015 |
| WO | 2016008655 A1 | 1/2016 |

* cited by examiner

SEMI-CRYSTALLINE MIXTURE OF POLYESTER POLYOLS, AND THE USE THEREOF

The present invention relates to a semi-crystalline mixture of polyester polyols which recrystallises upon melting, which can be obtained by polycondensing a reaction mixture comprising one or more dicarboxylic acids selected from saturated aliphatic dicarboxylic acids having an even number of at least 8 methylene groups and one or more diols selected from aliphatic diols, which have at least one ether function. Another aspect of the invention relates to a polymeric material resulting from the chemical modification of the mixture of polyester polyols with organic compounds containing at least one isocyanate group and/or epoxide group. The mixtures and materials according to the invention are characterised by relatively low melting enthalpies, while the melting temperature can be adjusted in a range from −30 to 60° C., meaning that it is possible to obtain easily fusible formulations containing the mixtures and materials according to the invention. The mixtures and materials according to the invention also provide such formulations with high elasticity and breaking resistance. The present invention therefore comprises the use of the polyester polyols and polymeric materials according to the invention as deforming, fusing, and extrusion means in thermoplastic materials, and the use thereof for producing of adhesives and sealants, in particular of hot-melt adhesives and reactive adhesives.

Of particular commercial importance for adhesives or sealants in general are polyesters, that have terminal hydroxyl groups, so-called polyester polyols. As such, these are extremely stable and chemically easy to modify and are therefore frequently used as a prepolymeric constituent of reactive adhesive systems. In this cotext, EP 1 149 850 A1 discloses crystalline polyester polyols having an average molecular weight of 1,500-15,000 g/mole obtainable by condensation of a polybasic carboxylic acid with 1,10- or 1,12-dodecanediol, which, when modified with an isocyanate resin, can be a constituent of a hot-melt adhesive. Polyester polyols or polyester polyols modified with isocyanate resins enable the hot-melt adhesive to set quickly at the application temperature and deliver an adhesive bond with high mechanical stability below the crystallisation temperature. In the same technical field, DE 11 2015 003 392 T5 discloses hot-melt adhesives on the basis of polyester polyols with a low melting point of 130-135° C., which result from a mixture of different dicarboxylic acids, inter alia, dodecanedioic acid and a mixture of diols, inter alia, dipropylene glycol after polycondensation.

Therefore, for polyester polyols as a constituent of adhesive formulations or sealant formulations, a low melting enthalpy in the application of the adhesive film is advantageous for an energy-efficient manufacturing method. Furthermore, in these applications, the requirement is made that a high elasticity and mechanical stability of the adhesive bond or the seal is ensured after setting the adhesive film or the seal. This often leads to the difficulty that an improvement in mechanical stability is often at the expense of elasticity and the material tends to experience cohesive failure under mechanical stress. Usually, a material with a low melting enthalpy also has a low crystallinity, so that the providing of a material with a relatively low melting enthalpy and high mechanical stability and breaking resistance, i.e. elasticity, is accompanied by considerable development and testing effort.

A similar requirement profile is also advantageous in application areas that are clearly different from adhesives and is therefore required. For the shaping of thermoplastic materials by means of extrusion or injection moulding method, a low melting enthalpy is obviously advantageous and also desirable that the material has a high elasticity and mechanical stability below its softening point.

The present invention therefore has the objective to provide a mixture of polyester polyols, through which a relatively low melting enthalpy at a melting temperature in the range of −30° C. to 60° C. is accessible, but which at the same time, as a constituent of adhesives and/or sealants as well as thermoplastics below the softening point, gives a high elasticity and mechanical stability.

There is extensive scientific knowledge on semi-crystalline polyesters and their derivatives, which is also documented in patent literature in numerous applications of this substance class. Thus, inter alia, from the Encyclopedia of Polymer Science and Technology, 1964-1977, Vol. 11, Herman F. Mark, Polyesters is known that linear acyclic polyesters having a average molecular weight $M_n$ above 5,000 g/mol represent mostly waxy crystalline solids which have a melting range of 30 to 120° C., wherein the melting point increases with the number of methylene groups in the repeating unit of the polyesters and reaches values that correspond to those of the corresponding polyethylene, while polyesters of malonic acid may have extremely low melting points of up to −20° C. In this context, it is also generally known that, insofar as alkyl groups are introduced into the linear polyester chain, the melting point is further lowered and liquid polymer blends can still be obtained at 20° C. even at higher molecular weights. However, by increasing the paraffinic character of the dicarboxylic acid, crystallinity can be regained, for example as is the case with the polyester of sebacic acid with 1,2-propanediol. If the majority of the polyesters are based on a monomer which has cyclic structural units, the melting point of such crystalline polyesters can be above 200° C. and can be reduced to only up to 50° C. by admixing monomers which increase the amorphosity.

Therefore, there is a rich experience in adapting the crystalline properties of polyester blends and thus also their melting point by structural modification of the monomers and to adapt them in this way for certain applications.

Surprisingly, however, it was found that mixtures of semi-crystalline polyester polyols, which are built up from certain long-chain dicarboxylic acids and certain diols containing ether groups, recrystallise upon melting and thus require a relatively lower amount of heat for fusing. Surprisingly, such mixtures can also fulfill the requirement profile described above for high mechanical stability combined with excellent breaking resistance, thus elasticity in the area of adhesives, sealants and thermoplastics.

The requirement profile and therefore the object of the present invention is thus achieved by providing a semi-crystalline mixture of polyesterpolyols which recrystallises upon melting which is obtainable by polycondensation of a reaction mixture comprising one or more dicarboxylic acids and one or more diols, wherein (a) at least 50 mol % of the dicarboxylic acids are selected from saturated aliphatic dicarboxylic acids having an even number of at least 8 methylene groups which have neither a tertiary nor a quaternary carbon atom; and (b) at least 40 mol % of the diols are selected from aliphatic diols that have at least one ether function, however, having no tertiary or quaternary carbon atom.

Semi-crystalline mixtures of polyester polyols which recrystallise upon melting and which are obtained from the reaction mixture of components a) and b) according to the invention, have ring-ball crystalline phases below their softening point, measured in accordance with DIN EN 1238:2011, and are also characterised in that exothermic recrystallisation occurs during the endothermic melting process before reaching the softening point, that is, the transition to the liquid phase. Recrystallisation in the melting process is a typical material property of the mixture of polyesters according to the invention and can be proven by means of differential scanning calorimetry (DSC) at a heating rate of not more than 10 Kelvin per minute as an exothermic crystallisation peak in superposition with the endothermic melting peak before reaching the softening point. For this purpose, the obtained mixture of polyester polyols according to the invention is heated up after having been previously heated to above the softening point and brought to a temperature immediately after passing through the last crystallisation peak at a cooling rate of at least 10 Kelvin per minute, which can be detected differentially calorimetrically down to a temperature of −50° C. If reference is made in the following to the softening point of the blend of polyester, this means the softening point of the ring-ball is measured according to DIN EN 1238:2011.

A dicarboxylic acid or a diol are aliphatic according to the present invention if they are composed exclusively of carbon and hydrogen atoms in addition to oxygen atoms. A dicarboxylic acid according to the present invention also includes the corresponding single or double methyl ester and/or ethyl ester, the respective acid anhydride and the corresponding single or double acid chlorides.

A carbon atom is quaternary when it is covalently bonded to four other carbon atoms, while a tertiary carbon atom is covalently bonded to three other carbon atoms.

Mixtures of polyester polyols according to the invention, which are obtainable by polycondensation of components a) and b) require a lower melting enthalpy due to their tendency to recrystallise and are therefore easily fusible. Furthermore, the softening point of the polyester polyols lies within a temperature range of −30 to 60° C. and can be well adjusted in this range to a narrow temperature interval in this range, for example by selecting the aliphatic chain length of the dicarboxylic acid or that of the diol.

Surprisingly, the mixtures according to the invention give thermoplastic materials and also adhesives and/or sealants excellent mechanical stability and at the same time good elastic properties, insofar as they are contained in sufficient quantities.

For a stronger expression of the recrystallisation behaviour of the mixture according to the invention, it is preferable that at least 60 mol %, particularly preferably at least 70 mol % of the dicarboxylic acids are selected from dicarboxylic acids according to component a) of the reaction mixture and/or at least 60 mol %, particularly preferably at least 70 mol % of the diols are selected from diols according to component b) of the reaction mixture. In this way, the recrystallisation of the mixture according to the invention is more pronounced and the amount of heat necessary for reaching the softening point is further reduced.

On the other hand, in order to set a softening point not exceeding 60° C., it is preferable that the dicarboxylic acids according to component a) should not contain more than 24 methylene groups, more preferably not more than 18 methylene groups, more preferably not more than 16 methylene groups, wherein independently thereof the dicarboxylic acids according to component a) should preferably contain at least 10 methylene groups, in order to provide those polyester polyols for which recrystallisation is maximally pronounced at a softening point that is as low as possible. The preferred dicarboxylic acids according to component a) are therefore 1,10-decamethylenedicarboxylic acid, 1,12-dodecamethylenedicarboxylic acid, 1,14-tetradecamethylenedicarboxylic acid and 1,16-hexadecamethylenedicarboxylic acid.

The recrystallisation of the mixture of polyester polyols according to the invention is greatly attenuated by the presence of other long-chain dicarboxylic acids which do not represent dicarboxylic acids according to component a) of the mixture according to the invention. Therefore, in a preferred embodiment, the proportion of dicarboxylic acids which have no saturated aliphatic dicarboxylic acids with an even number of at least 8 methylene groups but at least 9 carbon atoms, relative to the total proportion of dicarboxylic acids in the reaction mixture, is less than 20 mol %, particularly preferably less than 10 mol %, particularly preferably less than 4 mol %.

On the other hand, certain dicarboxylic acids, in so far as they are contained in the reaction mixture and thus also become a structural constituent of the polyester polyols, can provide properties to the mixture according to the invention which are advantageous for certain applications. For example, the mechanical stability of materials containing significant amounts of the polyester polyols according to the invention can be significantly increased if the polyester polyols consist of a particular proportion of aromatic dicarboxylic acids. In particular, isophthalic acid, terephthalic acid, orthophthalic acid, furan dicarboxylic acid, in particular 2,5-furan dicarboxylic acid, which are also contained in the reaction mixture in a particularly preferred embodiment, should be mentioned here. The proportion of aromatic dicarboxylic acids in the polyester polyols according to the invention also has a positive effect on adhesiveness if they are frequently used in adhesives and/or sealants modified with isocyanates and/or epoxides. In this field of application, polyester polyols according to the invention, in which unsaturated dicarboxylic acids with less than 9 carbon atoms are contained, can also be used, as they provide mixtures which can be cross-linked via the aliphatic double bond and thus gain mechanical stability and cohesion of the adhesive bond or seal. In particular, itaconic acid, fumaric acid and/or maleic acid, which are also contained in the reaction mixture in a particularly preferred form, should be mentioned here.

In order for the positive effect of these admixtures to unfold in the reaction mixture, it is preferable that the proportion of unsaturated dicarboxylic acids with less than 9 carbon atoms and/or aromatic dicarboxylic acids, an admixture of aromatic dicarboxylic acids being particularly effective for improving the mechanical stability and cohesion in adhesive bonds or sealants, should be emphasised, relative to the total amount of dicarboxylic acids in the reaction mixture for the production of the mixture of polyester polyols according to the invention, should be at least 2 mol % particularly preferably in each case at least 8 mol %, particularly preferably in each case at least 15 mol %.

The admixture of these dicarboxylic acids to improve the mechanical stability of the polyester polyols should, however, be carried out with caution and should not significantly reduce the general property of the polyester polyols to be easily fusible. Therefore, the proportions of unsaturated dicarboxylic acids with less than 9 carbon atoms and aromatic dicarboxylic acids in total are preferably less than 40 mol %, particularly preferably less than 30 mol % based on the total amount of dicarboxylic acids in the reaction mixture.

On the other hand, it is essential for the presence of recrystallisation of the mixture of polyester polyols that a significant proportion of at least 40 mol % of the aliphatic diols of the reaction mixture has neither quaternary nor tertiary carbon atoms and is thus built up linearly. It is also important here that the softening point is set at the lowest possible temperatures, but that the mixture is still sufficiently semi-crystalline for the recrystallisation effect to occur. Thus, the softening point can be reduced by multiple ether functionalities in the diol, but at the same time this is at the expense of the material's ability to recrystallise. In a preferred embodiment, the aliphatic diols of component b) of the mixture according to the invention are therefore selected from diols of the general structural formula H—([O—(CH$_2$)$_m$]$_x$—[O—(CH$_2$)$_n$]$_y$)$_z$—OH with m, n as positive integers from 1 to 4, with x, y as non-negative integers, wherein x+y is at least 1, and with z as a positive integer, where (x+y)z is at least 2 and z(x(m+1)+y(n+1)) is less than 40. Representatives of such diols are, in addition to diethylene glycol, triethylene glycol or dipropylene glycol, tripropylene glycol and the respective other homologs, that are also composed of ethylene glycol and 1,3-propylene glycol units, for example 3-oxahexane-1,6-diol, 3,7 Dioxanonan-1,9-diol, 3,8-dioxaoctan-1,10-diol.

In this context, it is particularly preferable for the aliphatic diols according to component b) that m is 2, x is 1, y is zero and z is preferably less than 10, more preferably less than 8, most preferably less than 6. Such diols are diethylene glycol, triethylene glycol, tetraethylene glycol, pentaethylene glycol and hexaethylene glycol.

It is also applies for the other aliphatic diols that their proportion should not be present in the reaction mixture to such an extent that the expression of the mixture of polyester polyols for recrystallisation is significantly reduced, insofar as they are not diols as defined in component b). The predominant linear structure of the diols with ether functionality is of decisive importance here, so that in a preferred embodiment the proportion of diols which do not represent diols according to component b) and have both at least one ether function and tertiary and/or quaternary carbon atoms, relative to the total proportion of diols in the reaction mixture for producing the mixture of polyester polyols according to the invention, is less than 20 mol %, particularly preferably less than 10 mol %, in particular preferably less than 4 mol %.

However, a certain proportion of such aliphatic diols in the reaction mixture which have no ether function and not more than 10 carbon atoms may be useful if the polyester polyol mixture is required to melt completely at a certain temperature interval. Thus, aliphatic linear diols with short chain lengths shift the softening point to higher temperatures, while branched diols bring about a lowering of the softening point.

Therefore, aliphatic diols are present in a preferred embodiment in the reaction mixture for the production of the polyester polyols according to the invention, in addition to the diols according to component b), which have no ether function and not more than 10 carbon atoms, which in turn are preferably selected from ethylene glycol, 1,3-propanediol, 1,4-butanediol, 1,6-hexanediol and/or 1,8-octanediol, wherein the proportion of which, relative to the total amount of diols, is preferably at least 1 mol %, but preferably less than 40 mol %, more preferably less than 20 mol % and more preferably less than 10 mol %, in order to on the one hand be able to bring about a significant shift in the softening point, but on the other hand not to eliminate the tendency of the resulting mixture of polyester polyols to recrystallise.

Unbranched β-, γ-, δ- and/or ε-hydroxycarboxylic acids, which may also be present in their lactone form, can increase in small amounts the elasticity of materials obtained from mixtures of polyester polyols modified with isocyanate and/or epoxide groups according to the invention. Accordingly, for special applications in which a high elasticity of a polymeric material is required which refers on the polyester polyols in accordance with the invention, it may be preferred that the proportion of unbranched β-, γ-, δ- and/or ε-hydroxycarboxylic acids, which may also be present in their lactone form, relative to the total proportion of dicarboxylic acids, is at least 1 mol %, particularly preferably at least 4 mol %, but to preserve the property of the polyester polyols it is easy to melt preferably in total less than 35 mol %, particularly preferably in total less than 22 mol %, particularly preferably in total less than 15 mol % of such hydroxycarboxylic acids based on the total proportion of dicarboxylic acids in the reaction mixture.

For a far-reaching conversion of the monomeric constituents of the reaction mixture to a mixture of polyester polyols according to the invention, which has partial crystallinity in the solid state and recrystallises upon melting, it is preferable that the proportion of other condensable organic compounds which are neither dicarboxylic acids nor diols nor a hydroxycarboxylic acid selected from unbranched β-, γ-, δ- and/or ε-hydroxycarboxylic acids in the reaction mixture is in total less than 10 weight % relative to the total amount of dicarboxylic acids and diols. In this context, a condensable organic compound means a compound which, under the selected reaction conditions, is capable of adding either with the dicarboxylic acids or with the diols of the reaction mixture to their functional groups to form a covalent compound with elimination of water or acids or with ring opening, in particular, hydroxyl- and/or carboxyl-containing organic compounds as well as lactones are to be understood as a condensable compound.

For the same recitals, it is advantageous if the proportion of organic compounds containing isocyanate groups in the reaction mixture is less than 1 weight % calculated as HN=C=O relative to the total amount of dicarboxylic acids and diols. In this context, an isocyanate group includes both free and blocked or protected isocyanate groups.

In order to give a sufficient number of terminal hydroxyl groups to the mixture of polyester polyols according to the invention for subsequent chemical modification by addition of isocyanate groups and/or epoxide groups, it is advantageous if the diols are contained in the reaction mixture in a molar excess relative to the dicarboxylic acids, but preferably not above an excess of 1.2:1, otherwise a portionwise addition of the diol to the reaction mixture or the presentation of the diol during the procedure is necessary in order to achieve a sufficiently high average molecular weight of the polyester polyols of the mixture, wherein these mixtures are then structurally similar to those obtainable from stoichiometric reactions and are characterised only by an increased proportion of unreacted diols, which must also be avoided.

Ideal in terms of molecular weight distribution, which essentially determines the recrystallisation behavior of the mixture, and hydroxyl functionality, which determines compatibility with monofunctional and polyfunctional isocyanates and/or epoxides, mixtures of polyester polyols with an acid number of less than 50 mg KOH/g have been found to be ideal, particularly preferably less than 10 mg KOH/g, in particular preferably less than 5 mg KOH/g and very particularly preferably less than 2 mg KOH/g each per gram of the reaction mixture, wherein the hydroxyl number is preferably in the range from 10 to 150 mg KOH/g, particularly preferably in the range from 20 to 120 mg KOH/g respectively per gram of the reaction mixture. In a particularly preferred embodiment, the mixture of polyester polyols according to the invention has an acid number below 5 mg KOH/g and is obtained from a reaction mixture of components a) and b), the diols being present in the reaction mixture in a molar excess relative to the dicarboxylic acids, but not above an excess of 1.2:1.

The acid number is, according to the invention, an experimentally determinable measured variable which is a measure for the number of free acid groups in the respectively defined reference amount, for example per gram of the reaction mixture. The acid number is determined by dissolving a weighed sample of the reference amount in a solvent mixture of methanol and distilled water in a volume ratio of 3:1 and then titrated potentiometrically with 0.05 mol/l KOH in methanol. The potentiometric measuring is carried out with a single-rod measuring chain (LL-Solvotrode® of the Co. Methrom; reference electrolyte: 0.4 mol/l tetraethylammonium bromide in ethylene glycol). The acid number corresponds to the added amount of KOH per gram of the reference amount at the inflection point of the potentiometric titration curve.

Similarly, according to the invention, the hydroxyl number can be determined experimentally by potentiometric titration as a measure of the number of free hydroxyl groups in the respectively defined reference amount, for example per gram of the reaction mixture. For this purpose, a weighted sample of the reference amount is heated in a reaction solution of 0.1 mol/l of phthalic anhydride in pyridine at 130° C. for 45 minutes and 1.5 times the volume of the reaction solution of pyridine is added and then mixed with 1.5 times the volume of the reaction solution of deionised water (K<1 μScm$^1$). The released amount of phthalic acid is titrated in this mixture by means of 1 M sodium hydroxide solution. The potentiometric measuring is carried out with a single-rod measuring chain (LL-Solvotrode® of the Co. Methrom; reference electrolyte: 0.4 mol/l tetraethylammonium bromide in ethylene glycol). The hydroxyl number corresponds to the added amount of NaOH per gram of the reference amount at the inflection point of the potentiometric titration curve.

The previously defined mixtures with respect to acid number and hydroxyl number usually have a number-average molecular weight in the range of 2,000-5,000 g/mol with a polydispersity of less than 2.5, so that this molecular weight range and the associated polydispersity are also preferred according to the invention in order to obtain mixtures which are both easily fusible and can give high elasticity and mechanical stability to polymeric materials in chemically modified form. The average molecular weight can be determined from a sample of the reaction mixture by gel permeation chromatography after calibration against polystyrene standards. For this purpose, at a column oven temperature of 40° C., chromatography is carried out by elution with tetrahydrofuran, wherein the distribution curve is recorded by means of a concentration-dependent RI detector which continuously determines the refractive index in the eluate at a temperature of likewise 40° C.

The mixture of polyester polyols according to the invention is caused by condensation of the constituents of the reaction mixture. In a preferred embodiment, the condensation in substance is carried out at a temperature in the range of 50 to 300° C., particularly preferred above 80° C., however particularly preferred below 240° C. and possibly in the presence of a catalyst preferably selected from alkoxides of the element titanium. Furthermore, it is preferred that condensate, in particular water or methanol/ethanol or HCl, insofar as the corresponding esters or acid chlorides are used, is removed from the reaction mixture, preferably at reduced pressure, which is preferably at least temporarily below 50 mbar.

In a particularly preferred embodiment, the present invention therefore relates to a semi-crystalline mixture of polyester polyols which recrystallizes upon melting having an acid number below 5 mg KOH/g and which is obtainable or produced by polycondensation of a reaction mixture comprising one or more dicarboxylic acids and one or more diols, wherein (a) at least 50 mol % of the dicarboxylic acids are selected from saturated aliphatic dicarboxylic acids having an even number of at least 8 methylene groups and having neither a tertiary nor a quaternary carbon atom;

(b) at least 40 mol % of the diols are selected from aliphatic diols having at least one ether function but do not have a tertiary or quaternary carbon atom;

(c) possibly a catalyst, is preferably selected from alkoxides of the element Ti;

wherein the diols are contained in the reaction mixture in molar excess relative to the dicarboxylic acids, and wherein the reaction mixture is maintained in a temperature range of 50-300° C. and the reaction mixture is not brought to a temperature below the temperature range until the acid number in the reaction mixture is below 5 mg KOH/g.

Insofar as the present invention also concerns a method for the production of a semi-crystalline mixture of a polyester polyol which recrystallises upon melting, in which a reaction mixture comprising one or more dicarboxylic acids as well as one or more diols and possibly a catalyst, preferably selected from alkoxides of the element Ti, wherein the diols are contained in a molar excess relative to the dicarboxylic acids, and (a) at least 50 mol % of the dicarboxylic acids are selected from saturated aliphatic dicarboxylic acids having an even number of at least 8 methylene groups which have neither a tertiary nor a quaternary carbon atom, and (b) at least 40 mol % of the diols are selected from aliphatic diols which have at least one ether function but no tertiary or quaternary carbon atom, is brought to a temperature in the range 50-300° C. for at least such a duration that the acid number in the reaction mixture falls to a value below 5 mg KOH/g.

In a preferred method according to the invention, at least in phases and while a temperature is set in the range of 50-300° C., condensate, in particular water or methanol/ethanol or HCl, insofar as the corresponding esters or acid chlorides are used, is removed from the reaction mixture, preferably at reduced pressure which is preferably at least temporarily below 50 mbar.

The preferred embodiments listed with respect to the mixture of polyester polyols according to the invention also apply analogously to the method of producing the mixture according to the invention.

The present invention further comprises a polymeric material obtainable by addition of such organic compounds containing at least one epoxide and/or isocyanate group, preferably at least two of these groups and more preferably at least two isocyanate groups, to terminal hydroxyl groups of a mixture of polyester polyols according to the invention. In this context, an isocyanate group includes both free and blocked or protected isocyanate groups. Such a polymeric material still exhibits high elasticity even if further cross-linking takes place via added but still unreacted isocyanate groups, for example after modification with polyfunctional isocyanates which either have at least one further isocyanate group or additional crosslinking functional groups such as epoxide, alkoxysilyl and/or acrylate groups. If the organic compounds already added to the polyester polyols, which contain further unreacted isocyanate groups, are "extinguished" by the addition of alcohols, the polymer material retains its thermoplastic properties with a high degree of adhesiveness and can also be easily fused. The polymeric material according to the invention is therefore suitable both as a constituent of thermoplastic materials, preferably as a tackifying agent in adhesives and/or sealants, especially preferred as a constituent of hot-melt adhesives, and also as a component in crosslinking reactive adhesives. With regard to the polymer material according to the invention, a chemical modification by means of toluene 2,4-diisocyanate, hexamethylene diisocyanate, isophorone diisocyanate, 1,4-cyclohexyl diisocyanate and/or diphenylmethane diisocyanate is preferred.

Accordingly, the present invention also relates, in a particular aspect, to the use of the mixture of polyester polyols or of the polymeric material according to the invention as a constituent of a thermoplastic material or of an adhesive and/or sealant. While the mixture of polyester polypoles according to the invention can be used both in thermoplastics as deforming and extrusion means or also as melting means for physically bonding adhesives and/or sealants, the polymeric material according to the invention can be used both in thermoplastics and as tackifying agent in adhesives, preferably in hot-melt adhesives, as well as in cross-linking reactive adhesives, since the polymeric material according to the invention allows a low application temperature and a high elasticity and mechanical stability of the adhesive bond.

EMBODIMENTS

In the following, the production of the mixtures of polyester polyols according to the invention is described and the respective melting behaviour is characterised by means of dynamic differential calorimetry (DSC) and compared with polyester polyols produced from dicarboxylic acids and diols which are not components a) or b) according to the first claim of the present invention.

The production of polyester polyol blends was carried out according to the following scheme:

In a 1 litre four-neck flask equipped with nitrogen discharge, thermostat, paddle stirrer and distillation arm, a quantity of dicarboxylic acid(s) with the corresponding amount of diol in molar excess relative to the amount of dicarboxylic acid(s) was presented and mixed. The reaction mixture was heated and stirred at a temperature of 200° C. in the nitrogen stream for about 8 hours. The reaction mixture was then cooled and 0.02 weight % was added to the tetraisopropyl titanate relative to the reaction mixture. Subsequently, the reaction mixture was heated to 200° C. and the pressure in the reaction flask was gradually reduced to 30 mbar. The acid number was controlled continuously, as explained in detail in the description of the invention. As soon as the acid number dropped below a value of 3 mg KOH/g in relation to the reaction mixture, the reaction mixture was first cooled to 80° C. and cooled, after which the reaction mixture was allowed to cool further to room temperature. Afterwards, the acid number and hydroxyl number were finally determined at 20° C. and the mixture was chromatographically characterised.

For chromatographic characterisation by gel permeation chromatography (GPC), a sample of the reaction mixture was dissolved with tetrahydrofuran and applied to the column and subsequently eluted with tetrahydrofuran. Gel permeation chromatography (GPC) with RI detector after calibration by means of polystyrene standards was performed at a column oven temperature of 40° C. and a temperature in the detector of 40° C. as well. The relative number and weight average molecular weight values were determined from the molecular weight distribution curve and the polydispersity was determined therefrom.

Table 1 shows the respective weighted samples and the specific monomers used for the production of the respective polyester polyols.

The polyester polyols produced according to Table 1 were measured by differential calorimetry, wherein a sample of the reaction mixture was first heated to 150° C. and then brought to −90° C. at a cooling rate of 10 Kelvin per minute. After 10 minutes at −90° C., the sample of the reaction mixture was heated to 150° C. at a rate of 10 Kelvin per minute and the DSC diagram was recorded.

Figure 1:
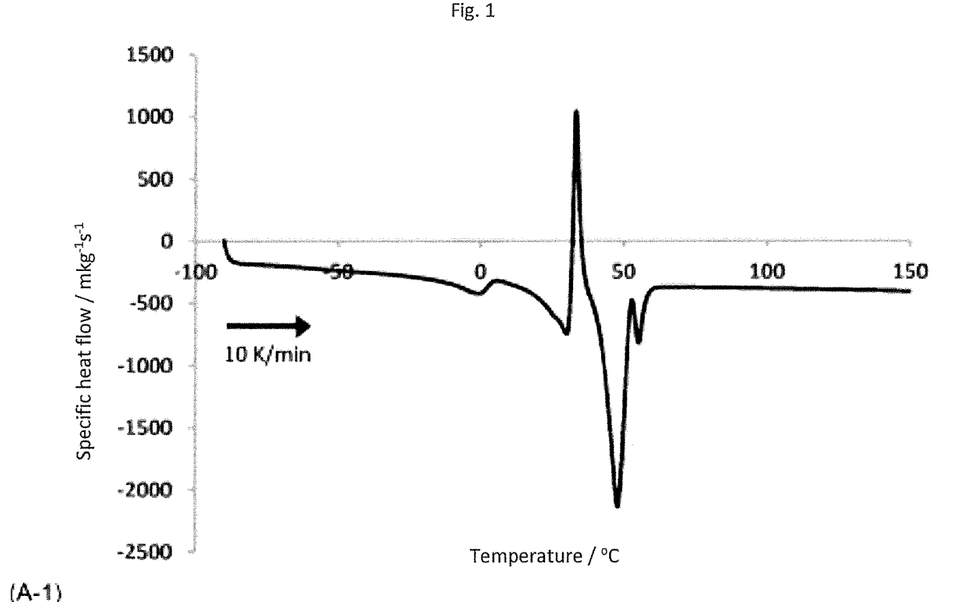
FIG. 1 illustrates a Differential Scanning calorimetery (DSC) diagram for mixtures of polyester polyols according to invention based on example A-1.

FIG. 1 illustrates a characteristic DSC diagram for mixtures of polyester polyols according to invention based on the concrete example A-1, which illustrates the effect of exothermic recrystallisation in superposition with the endothermic melting process.

Figure 2:
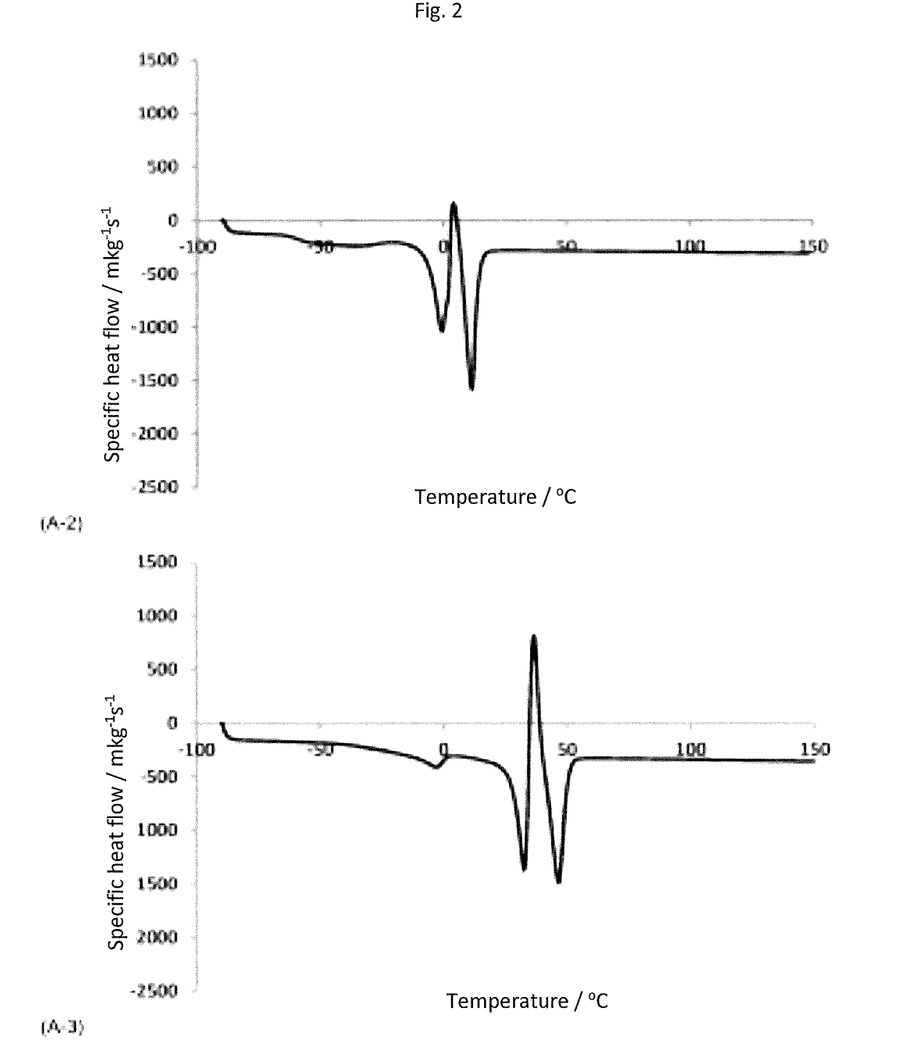
FIG. 2 illustrates a DSC diagram for polyester polyol blends of examples A-2 and A-3.

From FIG. 2 it becomes apparent that the polyester polyol blends (A-2) and (A-3) according to the invention also have an exothermic recrystallisation peak in superposition with the melting process. The melting process can be shifted to a significantly lower temperature range of 0-20° C. when using polyethylene glycol, wherein the proportion of recrystallisation in relation to the endothermic melting peak remains almost unchanged, so that a readily fusible mixture of polyester polyols continues to result.

Figure 3:
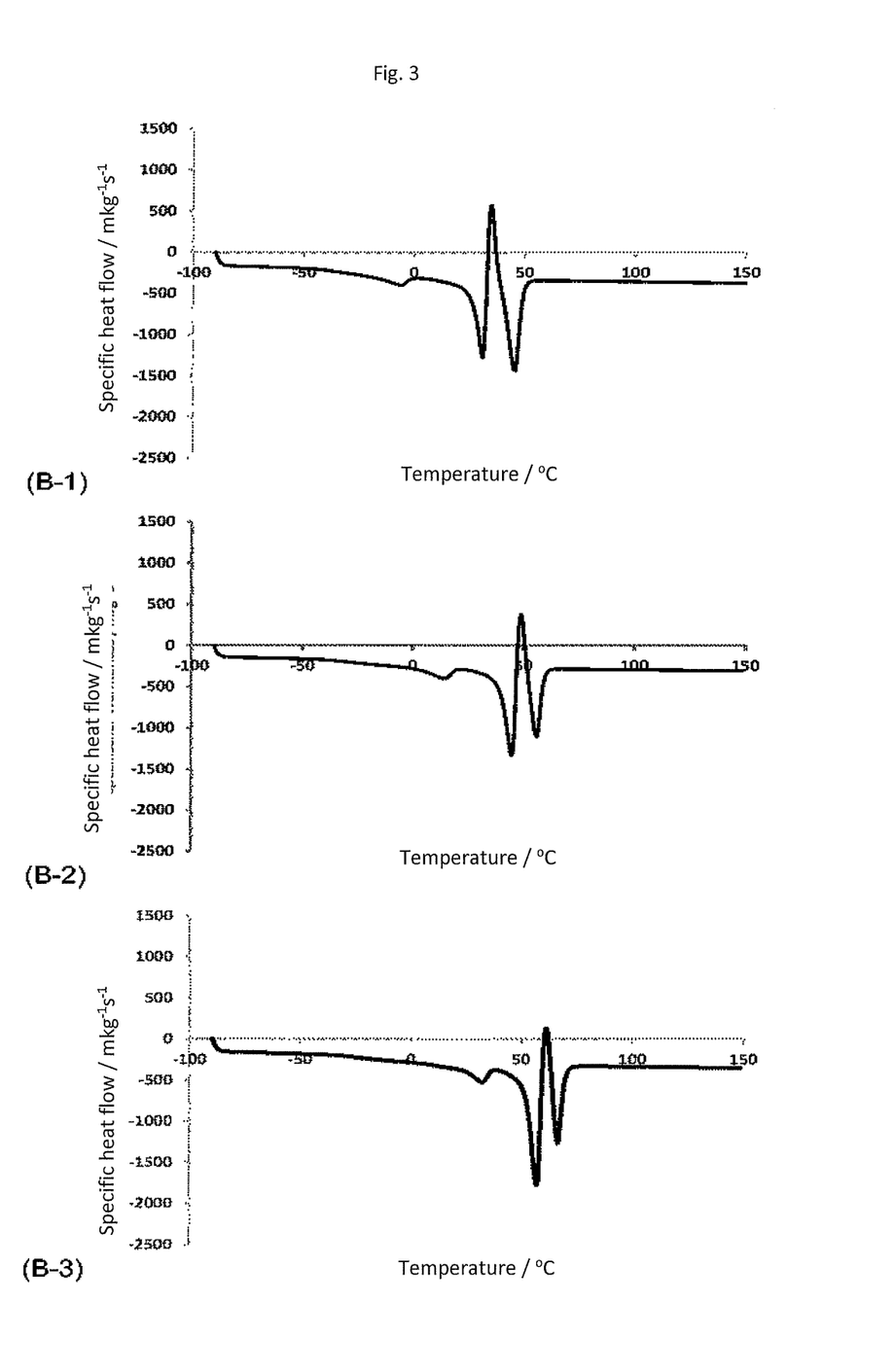
FIG. 3 illustrates a DSC diagram for polyester polyol blends of examples B-1, B-2 and B-3.

Also, the admixture of of 2,5-furanedicarboxylic acid (A-3) or isophtalic acid (B-1) hardly reduces the recrystallisation behavior, whereby a shift of the melting range does not occur.

Figure 4:
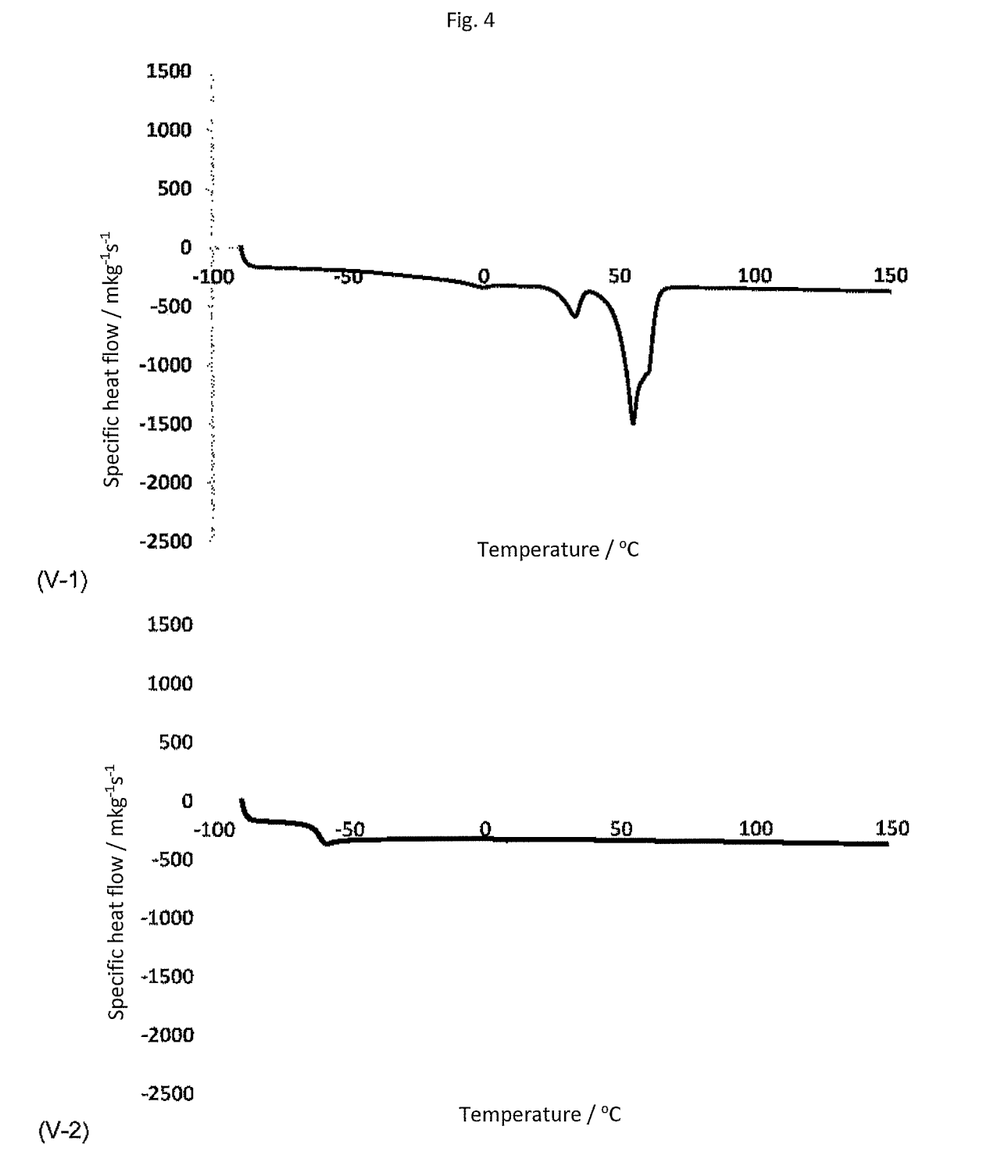
FIG. 4 illustrates a DSC diagram for examples V-1 and V-2.

Conversely, it can be clearly seen from the example V-1 in FIG. 4 that crystallinity is not causal for the presence of recrystallisation and that structural peculiarities due to the chemical constitution cause the effect of recrystallisation, so that the use of exclusively linear diols, which do not have ether function, is not effective. Similar results for polyester polyols, which are obtained from dicarboxylic acids, whose number of methylene groups lags behind the number required by the invention and only provide an amorphous material that does not have the desired mechanical stability and elasticity.

The variation of the chain length of the dicarboxylic acids in mixtures of polyester polyols according to the invention can shift the melting range per additional ethylene unit by approx. 10° C. to higher temperatures and thus be adapted to the specific application (see examples B-1, B-2 and B-3 in FIG. 3).

aliphatic dicarboxylic acids with an even number of at least 8 methylene groups but at least 9 carbon atoms, relative to the total proportion of dicarboxylic acids in the reaction mixture, is less than 20 mol %.

TABLE 1

| Ex. | Dicarboxylic acid type | Dicarboxylic acid weighted sample | Type | Diol weighted sample/g | $AN^1$ | $HN^2$ | $MN^3$ | $P^4$ |
|---|---|---|---|---|---|---|---|---|
| A-1 | DMA | 188 | DEG | 113 | 1.2 | 98 | 2466 | 1.9 |
| A-2 | DMA | 68 | PEG | 232 | 1.8 | 63 | 2519 | 2.0 |
| B-1 | DMA | 216 | DEG | 144 | 0.8 | 43 | 4303 | 2.3 |
|     | IPA | 42 |     |     |     |     |     |     |
| B-2 | DDMA | 226 | DEG | 135 | 1.0 | 53 | 4211 | 2.0 |
|     | IPA | 40 |     |     |     |     |     |     |
| B-3 | TDMA | 236 | DEG | 127 | 1.0 | 38 | 4738 | 2.4 |
|     | IPA | 37 |     |     |     |     |     |     |
| A-3 | DMA | 216 | DEG | 144 | 2.0 | 50 | 3696 | 2.3 |
|     | FA | 40 |     |     |     |     |     |     |
| V-1 | DMA | 145 | BD | 96 | 1.4 | 39 | 5134 | 2.3 |
|     | FA | 29 |     |     |     |     |     |     |
| V-2 | HMA | 173 | DEG | 127 | 1.7 | 62 | 3136 | 2.1 |

DMA 1,10-decamethylenedicarboxylic acid
DDMA 1,12-decamethylenedicarboxylic acid
TDMA 1,14-tetradecamethylenedicarboxylic acid
IPA Isophtalic acid
FA 2,5-furandicarboxylic acid
HMA 1,7-heptamethylendicarbon acid
DEG Diethylene glycol
PEG Polyethylene glycol (molecular weight 400 g/mol)
BD 1,4-butanediol
[1]acid number in mg KOH per gram of the reaction mixture
[2]Hydroxyl number in mg KOH per gram of the reaction mixture
[3]average molecular weight in g/mol
[4]Polydispersity

The invention claimed is:

1. A semi-crystalline mixture of polyester polyols which recrystallises upon melting prepared by polycondensation of a reaction mixture comprising one or more dicarboxylic acids and one or more diols, wherein
   (a) at least 50 mol % of the dicarboxylic acids are selected from saturated aliphatic dicarboxylic acids having an even number of at least 8 methylene groups which have neither a tertiary nor a quaternary carbon atom; and
   (b) at least 40 mol % of the diols are selected from aliphatic diols that have at least one ether function and have no tertiary or quaternary carbon atom, and
   the semi-crystalline mixture of polyester polyols have exothermic recrystallisation that occurs during an endothermic melting process before reaching their softening point or transition to the liquid phase.

2. The mixture according to claim 1, wherein at least 70 mol % of the dicarboxylic acids are selected from dicarboxylic acids according to component a) of the reaction mixture.

3. The mixture according to claim 1, wherein at least 70 mol % of the diols are selected from diols according to component b) of the reaction mixture.

4. The mixture according to claim 1, wherein the dicarboxylic acids according to component a) have not more than 24 methylene groups and at least 10 methylene groups.

5. The mixture according to claim 1, wherein the aliphatic diols of component b) are selected from diols of the general structural formula H—([O—(CH$_2$)$_m$]$_x$—[O—(CH$_2$)$_n$]$_y$)$_z$—OH with m, n as positive integers from 1 to 4, with x, y as non-negative integers, where x+y is at least 1, and with z as a positive integer, where (x+y)z is at least 2 and z(x(m+1)+y(n+1)) is less than 40.

6. The mixture according to claim 5, wherein m is 2, x is 1, y is zero and z is less than 10.

7. The mixture according to claim 1, wherein the proportion of dicarboxylic acids which do not have saturated 8. The mixture according to claim 1, wherein the reaction mixture further comprises unsaturated dicarboxylic acids having less than 9 carbon atoms and/or aromatic dicarboxylic acids.

9. The mixture according to claim 1, wherein the reaction mixture further comprises 2 mol % to less than 40 mol %, relative to the total proportion of dicarboxylic acids, of unsaturated dicarboxylic acids having less than 9 carbon atoms and/or aromatic dicarboxylic acids selected from isophthalic acid, terephthalic acid, orthophthalic acid, furanedicarboxylic acid, itaconic acid, fumaric acid and/or maleic acid.

10. The mixture according to claim 1, wherein the proportion of diols which do not represent diols according to component b) and have at least one ether function and a tertiary or quaternary carbon atom, based on the total proportion of diols, is less than 20 mol %.

11. The mixture according to claim 1, wherein the reaction mixture further comprises aliphatic diols which have no ether function and not more than 10 carbon atoms.

12. The mixture according to claim 1, wherein the reaction mixture further comprises 1 mol % to less than 40 mol %, relative to the total proportion of the diols, of aliphatic diols selected from ethylene glycol, 1,3-propanediol, 1,4-butanediol, 1,6-hexanediol and/or 1,8-octanediol.

13. The mixture according to claim 1, wherein the diols are contained in the reaction mixture in a molar excess relative to the dicarboxylic acids, but not above an excess of 1.2:1.

14. The mixture according to claim 1, wherein the (a) dicarboxylic acids are selected from 1,10-decamethylenedicarboxylic acid; 1,12-dodecamethylenedicarboxylic acid; 1,14-tetradecamethylenedicarboxylic acid; and 1,16-hexadecamethylenedicarboxylic acid; and/or the (b) aliphatic diols are selected from diethylene glycol; triethylene glycol;

tetraethylene glycol; pentaethylene glycol; hexaethylene glycol; dipropylene glycol; tripropylene glycol; 3-oxahexane-1,6-diol; 3,7 dioxanonan-1,9-diol; and 3,8-dioxaoctan-1,10-diol.

15. A polymeric material that is the reaction product of terminal hydroxyl groups in the semi-crystalline mixture of polyester polyols of claim 1 and an epoxide group and/or an isocyanate group in an organic compound containing at least one epoxide group and/or at least one isocyanate group.

16. A thermoplastic material, adhesive and/or sealant comprising the polymeric material of claim 15.

17. A thermoplastic material, adhesive and/or sealant comprising the semi-crystalline mixture of polyester polyols of claim 1.

18. A semi-crystalline mixture of polyester polyols which recrystallises upon melting prepared by polycondensation of a reaction mixture comprising one or more dicarboxylic acids and one or more diols, wherein
  (a) at least 50 mol % of the dicarboxylic acids are selected from saturated aliphatic dicarboxylic acids having an even number of at least 8 methylene groups which have neither a tertiary nor a quaternary carbon atom; and
  (b) at least 40 mol % of the diols are selected from aliphatic diols that have at least one ether function and have no tertiary or quaternary carbon atom;

wherein the reaction mixture further comprises unbranched β-, γ-, δ- and/or ε-hydroxycarboxylic acids and the lactone forms thereof.

19. The mixture according to claim 18, wherein the reaction mixture comprises 1 mol % to less than 35 mol %, based on the total proportion of dicarboxylic acids, of the unbranched β-, γ-, δ- and/or ε-hydroxycarboxylic acids and the lactone forms thereof.

20. The mixture according to claim 18, wherein the reaction mixture comprises less than 10 weight %, relative to the total proportion of dicarboxylic acids and diols, of other condensable organic compounds which are not dicarboxylic acids, diols or unbranched β-, γ-, δ- and/or ε-hydroxycarboxylic acids and the lactone forms thereof.

* * * * *